United States Patent
Nakamura et al.

(10) Patent No.: US 10,301,519 B2
(45) Date of Patent: *May 28, 2019

(54) ANTI-STATIC AGENT, ANTI-STATIC AGENT COMPOSITION, ANTI-STATIC RESIN COMPOSITION, AND MOLDING

(71) Applicant: ADEKA CORPORATION, Tokyo (JP)

(72) Inventors: Tatsuhito Nakamura, Saitama (JP); Kazukiyo Nomura, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 145 days.

This patent is subject to a terminal disclaimer.

(21) Appl. No.: 15/505,429

(22) PCT Filed: Aug. 5, 2015

(86) PCT No.: PCT/JP2015/072192
§ 371 (c)(1),
(2) Date: Feb. 21, 2017

(87) PCT Pub. No.: WO2016/027670
PCT Pub. Date: Feb. 25, 2016

(65) Prior Publication Data
US 2017/0267905 A1    Sep. 21, 2017

(30) Foreign Application Priority Data
Aug. 22, 2014  (JP) .................. 2014-168979

(51) Int. Cl.
| | |
|---|---|
| C09K 3/16 | (2006.01) |
| C08G 63/668 | (2006.01) |
| C08L 67/00 | (2006.01) |
| C08G 63/199 | (2006.01) |
| C08G 63/672 | (2006.01) |
| C08L 55/02 | (2006.01) |

(52) U.S. Cl.
CPC ............. *C09K 3/16* (2013.01); *C08G 63/199* (2013.01); *C08G 63/668* (2013.01); *C08G 63/672* (2013.01); *C08L 55/02* (2013.01); *C08L 67/00* (2013.01); *C08L 2201/04* (2013.01)

(58) Field of Classification Search
CPC ...... C09K 3/16; C08G 63/199; C08G 63/668; C08G 63/672; C08L 55/02; C08L 67/00
See application file for complete search history.

(56) References Cited

U.S. PATENT DOCUMENTS

2015/0353796 A1    12/2015  Nakamura et al.

FOREIGN PATENT DOCUMENTS

| CN | 102219984 A | 10/2011 |
| GB | 2 112 789 A | 7/1983 |
| JP | 58-118838 A | 7/1983 |
| JP | 3-290464 A | 12/1991 |
| JP | 6-057153 A | 3/1994 |
| JP | 10-273526 A | 10/1998 |
| JP | 10-287738 A | 10/1998 |
| JP | 2001-278985 A | 10/2001 |
| JP | 2006-335880 A | 12/2006 |
| WO | WO 2014/115745 A1 | 7/2014 |

OTHER PUBLICATIONS

Machine translation of CN 102219984. 2011. (Year: 2011).*
Machine translation of JP 2006-335880. 2006. (Year: 2006).*
Extended European Search Report dated Jan. 3, 2018 for Application No. 15833531.5.
International Search Report (PCT/ISA/210) issued in PCT/JP2015/072192, dated Nov. 2, 2015.
Written Opinion (PCT/ISA/237) issued in PCT/JP2015/072192, dated Nov. 2, 2015.

* cited by examiner

Primary Examiner — John E Uselding
(74) Attorney, Agent, or Firm — Birch, Stewart, Kolasch & Birch, LLP

(57) ABSTRACT

Provided are: an antistatic agent and an antistatic agent composition which are capable of providing excellent antistatic effect in a small amount and have sufficient persistence and wiping resistance; and an antistatic resin composition and a molded article using the same.

The antistatic agent includes a polymer compound (E) having a structure in which a diol, a dicarboxylic acid, a compound (B) which comprises at least one group represented by the following Formula (1) and has hydroxyl groups at both ends, and a polycarboxylic acid compound (D) are bound via ester bonds:

$$-CH_2-CH_2-O- \qquad (1).$$

12 Claims, No Drawings

ANTI-STATIC AGENT, ANTI-STATIC AGENT COMPOSITION, ANTI-STATIC RESIN COMPOSITION, AND MOLDING

TECHNICAL FIELD

The present invention relates to improvement of an antistatic agent, an antistatic agent composition, an antistatic resin composition (hereinafter, also simply referred to as "resin composition") and a molded article.

BACKGROUND ART

Thermoplastic resins are important materials that are indispensable in the modern world because they not only are lightweight and easy to process but also have excellent properties in that, for example, their base materials can be designed in accordance with the intended use. In addition, thermoplastic resins have excellent electrical insulation properties and are thus often utilized in the components and the like of electrical appliances. However, there is a problem that thermoplastic resins are easily electrically charged by friction and the like because of their excessively high insulation performance.

An electrically charged thermoplastic resin attracts dust and dirt in the surroundings and thus causes a problem of deteriorating the outer appearance of its molded article. Further, among electronic products, for example, in precision instruments such as computers, an electric charge may interfere with normal circuit operation. Moreover, there are also problems caused by an electric shock. An electric shock to a person from a resin not only causes discomfort but also potentially induces accidental explosion in the presence of flammable gas or dust.

In order to solve these problems, synthetic resins are conventionally subjected to an antistatic treatment. The most common antistatic treatment method is an addition of an antistatic agent to a synthetic resin of interest. Examples of the antistatic agent include coating-type antistatic agents that are coated on the surface of a resin molded article and kneading-type antistatic agents that are added when a resin is molded; however, the coating-type antistatic agents have poor persistence, and coating of a large amount of such an organic substance on a surface leads to a problem that objects coming into contact with the surface are contaminated.

From these viewpoints, conventionally, kneading-type antistatic agents have mainly been examined and, for example, the use of polyether ester amide has been proposed for the purpose of imparting antistaticity to polyolefin-based resins (Patent Documents 1 and 2). Further, a block polymer having a structure in which a polyolefin block and a hydrophilic polymer block are repeatedly and alternately bound with each other has been proposed (Patent Document 3).

RELATED ART DOCUMENTS

Patent Documents

Patent Document 1: Japanese Unexamined Patent Application Publication No. S58-118838
Patent Document 2: Japanese Unexamined Patent Application Publication No. H3-290464
Patent Document 3: Japanese Unexamined Patent Application Publication No. 2001-278985

SUMMARY OF THE INVENTION

Problems to be Solved by the Invention

However, not only these conventional antistatic agents cannot demonstrate sufficient antistatic performance unless they are added in a large amount with respect to a resin, but also their antistatic effects are not persistent enough. In addition, there is a problem that wiping of the surface of a molded article of the resin causes a reduction in the antistatic effect. In view of the above, an object of the present invention is to provide an antistatic agent and an antistatic agent composition which are capable of providing excellent antistatic effect in a small amount and have sufficient persistence and wiping resistance. Another object of the present invention is to provide an antistatic resin composition which has sufficient persistence and wiping resistance and exhibits excellent antistatic properties. Yet another object of the present invention is to provide a molded article composed of a thermoplastic resin, whose commercial value is not likely to be reduced by surface contamination or dust adhesion caused by static electricity.

Means for Solving the Problems

The present inventors intensively studied to solve the above-described problems, thereby completing the present invention.

That is, the antistatic agent of the present invention is characterized by comprising a polymer compound (E) having a structure in which a diol, a dicarboxylic acid, a compound (B) which comprises at least one group represented by the following Formula (1) and has hydroxyl groups at both ends, and a polycarboxylic acid compound (D) are bound via ester bonds:

$$-CH_2-CH_2-O- \qquad (1)$$

In the antistatic agent of the present invention, it is preferred that the polymer compound (E) has a structure in which a polyester (A), which is constituted by a diol and a dicarboxylic acid, the compound (B) and the polycarboxylic acid compound (D) are bound via ester bonds.

In the antistatic agent of the present invention, it is also preferred that the polymer compound (E) has a structure in which a block polymer (C) having hydroxyl groups at both ends and the polycarboxylic acid compound (D) are bound via an ester bond, the block polymer (C) comprising a block constituted by the polyester (A) and a block constituted by the compound (B) that are repeatedly and alternately bound via ester bonds.

Further, in the antistatic agent of the present invention, it is preferred that the polyester (A) has a structure comprising carboxyl group at one or both ends. Still further, in the antistatic agent of the present invention, it is preferred that the block constituted by the polyester (A) has a number-average molecular weight of 800 to 8,000 in terms of polystyrene; the block constituted by the compound (B) has a number-average molecular weight of 400 to 6,000 in terms of polystyrene; and the block polymer (C) has a number-average molecular weight of 5,000 to 25,000 in terms of polystyrene. Yet still further, in the antistatic agent of the present invention, it is preferred that the compound (B) be a polyethylene glycol. Yet still further, in the antistatic agent of the present invention, it is preferred that the polycarboxylic acid compound (D) is a carboxylic acid having three or more carboxyl groups.

The antistatic agent composition of the present invention is characterized by comprising at least one selected from the group consisting of alkali metal salts and Group II element salts in the antistatic agent of the present invention.

Further, the antistatic resin composition of the present invention is characterized by comprising the antistatic agent of the present invention or the antistatic agent composition of the present invention in a thermoplastic resin.

In the antistatic resin composition of the present invention, it is preferred that the thermoplastic resin be at least one selected from the group consisting of polyolefin-based resins, polystyrene-based resins and copolymers thereof. In the antistatic resin composition of the present invention, it is also preferred that the mass ratio of the thermoplastic resin and the antistatic agent or the antistatic agent composition be in a range of 99/1 to 40/60.

The molded article of the present invention is characterized by being composed of the antistatic resin composition of the present invention.

Effects of the Invention

According to the present invention, an antistatic agent and an antistatic agent composition, which are capable of providing excellent antistatic effect in a small amount and have sufficient persistence and wiping resistance, can be provided. In addition, according to the present invention, an antistatic resin composition which has sufficient persistence and wiping resistance and exhibits excellent antistatic properties can be provided. Further, according to the present invention, a molded article composed of a thermoplastic resin, whose commercial value is not likely to be reduced by surface contamination or dust adhesion caused by static electricity, can be provided.

MODE FOR CARRYING OUT THE INVENTION

Embodiments of the present invention will now be described in detail.

The polymer compound (E) according to the present invention has a structure in which a diol, a dicarboxylic acid, a compound (B) which comprises at least one group represented by the following Formula (1) and has hydroxyl groups at both ends, and a polycarboxylic acid compound (D) are bound via ester bonds:

The polymer compound (E) can be obtained by allowing a diol, a dicarboxylic acid, a compound (B) which comprises at least one group represented by the Formula (1) and has hydroxyl groups at both ends, and a polycarboxylic acid group (D) to undergo an esterification reaction.

First, the diol used in the present invention will be described.

Examples of the diol used in the present invention include aliphatic diols and aromatic group-containing diols. Two or more of these diols may be used in combination. Examples of the aliphatic diols include 1,2-ethanediol (ethylene glycol), 1,2-propanediol (propylene glycol), 1,3-propanediol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylol heptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, 1,4-cyclohexane dimethanol, hydrogenated bisphenol A, 1,2-, 1,3- or 1,4-cyclohexanediol, cyclododecanediol, dimer diol, hydrogenated dimer diol, diethylene glycol, dipropylene glycol, triethylene glycol and polyethylene glycol. Among these aliphatic diols, 1,4-cyclohexane dimethanol and hydrogenated bisphenol A are preferred because of their compatibility with thermoplastic resins and antistatic properties, and 1,4-cyclohexane dimethanol is more preferred.

The aliphatic diols are preferably hydrophobic; therefore, among aliphatic diols, hydrophilic polyethylene glycols are not preferred. This, however, does not apply to those cases where they are used in combination with other diol.

Examples of the aromatic group-containing diols include polyhydroxyethyl adducts of mononuclear dihydric phenol compounds, such as bisphenol A, 1,2-hydroxybenzene, 1,3-hydroxybenzene, 1,4-hydroxybenzene, 1,4-benzenedimethanol, bisphenol A-ethylene oxide adducts, bisphenol A-propylene oxide adduct, 1,4-bis(2-hydroxyethoxy)benzene, resorcin and pyrocatechol. Among these aromatic group-containing diols, bisphenol A-ethylene oxide adducts and 1,4-bis(β-hydroxyethoxy)benzene are preferred.

Next, the dicarboxylic acid used in the present invention will be described.

Examples of the dicarboxylic acid used in the present invention include an aliphatic dicarboxylic acid and an aromatic dicarboxylic acid. The dicarboxylic acid may be a mixture of the aliphatic dicarboxylic acid and the aromatic dicarboxylic acid.

The aliphatic dicarboxylic acid may be a derivative (such as an acid anhydride, an alkyl ester, an alkali metal salt or an acid halide) of an aliphatic dicarboxylic acid. Further, two or more aliphatic dicarboxylic acids and derivatives thereof may be used in combination.

The aliphatic dicarboxylic acid is preferably, for example, an aliphatic dicarboxylic acid having 2 to 20 carbon atoms, examples of which include oxalic acid, malonic acid, succinic acid, glutaric acid, adipic acid, pimelic acid, suberic acid, azelaic acid, sebacic acid, 1,10-decanedicarboxylic acid, 1,4-cyclohexanedicarboxylic acid, dimer acid, maleic acid and fumaric acid. Among these aliphatic dicarboxylic acids, from the standpoints of the melting point and heat resistance, ones having 4 to 16 carbon atoms are preferred, and ones having 6 to 12 carbon atoms are more preferred.

The aromatic dicarboxylic acid may be a derivative (such as an acid anhydride, an alkyl ester, an alkali metal salt or an acid halide) of an aromatic dicarboxylic acid. Further, two or more aromatic dicarboxylic acids and derivatives thereof may be used in combination.

The aromatic dicarboxylic acid is preferably, for example, an aromatic dicarboxylic acid having 8 to 20 carbon atoms, examples of which include terephthalic acid, isophthalic acid, phthalic acid, phenylmalonic acid, homophthalic acid, phenylsuccinic acid, β-phenylglutaric acid, α-phenyladipic acid, β-phenyladipic acid, biphenyl-2,2'-dicarboxylic acid, biphenyl-4,4'-dicarboxylic acid, naphthalenedicarboxylic acid, sodium 3-sulfoisophthalate, and potassium 3-sulfoisophthalate.

Next, the compound (B) used in the present invention, which comprises at least one group represented by the following Formula (1) and has hydroxyl groups at both ends, will be described.

The compound (B) which comprises at least one group represented by the following Formula (1) and has hydroxyl groups at both ends is preferably a hydrophilic compound, more preferably a polyether having the group represented by the Formula (1), particularly preferably a polyethylene glycol represented by the following Formula (2):

(2)

In the Formula (2), m represents a number of 5 to 250. From the standpoints of the heat resistance and compatibility, m is preferably 20 to 150.

Examples of the compound (B) include polyethylene glycols obtained by addition reaction of ethylene oxide; and polyethers obtained by addition reaction of ethylene oxide and at least one other alkylene oxide (e.g., propylene oxide, or 1,2-, 1,4-, 2,3- or 1,3-butylene oxide), which may be random or block polyethers.

Examples of the compound (B) also include compounds having a structure in which ethylene oxide is added to an active hydrogen atom-containing compound; and compounds having a structure in which ethylene oxide and at least one other alkylene oxide (e.g., propylene oxide, or 1,2-, 1,4-, 2,3- or 1,3-butylene oxide) are added. The addition in these compounds may be random or block addition.

The active hydrogen atom-containing compound is, for example, a glycol, a dihydric phenol, a primary monoamine, a secondary diamine or a dicarboxylic acid.

As the glycol, aliphatic glycols having 2 to 20 carbon atoms, alicyclic glycols having 5 to 12 carbon atoms and aromatic glycols having 8 to 26 carbon atoms can be used.

Examples of the aliphatic glycols include ethylene glycol, 1,2-propylene glycol, 1,3-propanediol, 1,2-butanediol, 1,3-butanediol, 1,4-butanediol, 1,3-hexanediol, 1,4-hexanediol, 1,6-hexanediol, 2,5-hexanediol, 1,2-octanediol, 1,8-octanediol, 1,10-decanediol, 1,18-octadecanediol, 1,20-eicosanediol, diethylene glycol, triethylene glycol and thiodiethylene glycol.

Examples of the alicyclic glycols include 1-hydroxymethyl-1-cyclobutanol, 1,2-cyclohexanediol, 1,3-cyclohexanediol, 1,4-cyclohexanediol, 1-methyl-3,4-cyclohexanediol, 2-hydroxymethylcyclohexanol, 4-hydroxymethylcyclohexanol, 1,4-cyclohexane dimethanol and 1,1'-dihydroxy-1,1'-dicyclohexanol.

Examples of the aromatic glycols include dihydroxymethylbenzene, 1,4-bis(β-hydroxyethoxy)benzene, 2-phenyl-1,3-propanediol, 2-phenyl-1,4-butanediol, 2-benzyl-1,3-propanediol, triphenylethylene glycol, tetraphenylethylene glycol and benzopinacol.

As the dihydric phenol, a phenol having 6 to 30 carbon atoms can be used, and examples thereof include catechol, resorcinol, 1,4-dihydroxybenzene, hydroquinone, bisphenol A, bisphenol F, bisphenol S, dihydroxydiphenyl ether, dihydroxydiphenyl thioether, binaphthol, and alkyl (C1 to C10) or halogen substitution products of these phenols.

Examples of the primary monoamine include aliphatic primary monoamines having 1 to 20 carbon atoms, such as methylamine, ethylamine, n-propylamine, isopropylamine, n-butylamine, s-butylamine, isobutylamine, n-pentylamine, isopentylamine, n-hexylamine, n-heptylamine, n-octylamine, n-decylamine, n-octadecylamine and n-eicosylamine.

Examples of the secondary diamine include aliphatic secondary diamines having 4 to 18 carbon atoms, heterocyclic secondary diamines having 4 to 13 carbon atoms, alicyclic secondary diamines having 6 to 14 carbon atoms, aromatic secondary diamines having 8 to 14 carbon atoms, and secondary alkanoldiamines having 3 to 22 carbon atoms.

Examples of the aliphatic secondary diamines include N,N'-dimethylethylenediamine, N,N'-diethylethylenediamine, N,N'-dibutylethylenediamine, N,N'-dimethylpropylenediamine, N,N'-diethylpropylenediamine, N,N'-dibutylpropylenediamine, N,N'-dimethyltetramethylenediamine, N,N'-diethyltetramethylenediamine, N,N'-dibutyltetramethylenediamine, N,N'-dimethylhexamethylenediamine, N,N'-diethylhexamethylenediamine, N,N'-dibutylhexamethylenediamine, N,N'-dimethyldecamethylenediamine, N,N'-diethyldecamethylenediamine and N,N'-dibutyldecamethylenediamine.

Examples of the heterocyclic secondary diamines include piperazine and 1-aminopiperidine.

Examples of the alicyclic secondary diamines include N,N'-dimethyl-1,2-cyclobutanediamine, N,N'-diethyl-1,2-cyclobutanediamine, N,N'-dibutyl-1,2-cyclobutanediamine, N,N'-dimethyl-1,4-cyclohexanediamine, N,N'-diethyl-1,4-cyclohexanediamine, N,N'-dibutyl-1,4-cyclohexanediamine, N,N'-dimethyl-1,3-cyclohexanediamine, N,N'-diethyl-1,3-cyclohexanediamine and N,N'-dibutyl-1,3-cyclohexanediamine.

Examples of the aromatic secondary diamines include N,N'-dimethyl-phenylenediamine, N,N'-dimethyl-xylylenediamine, N,N'-dimethyl-diphenylmethanediamine, N,N'-dimethyl-diphenyl ether diamine, N,N'-dimethyl-benzidine and N,N'-dimethyl-1,4-naphthalenediamine.

Examples of the secondary alkanoldiamines include N-methyldiethanolamine, N-octyldiethanolamine, N-stearyldiethanolamine and N-methyldipropanolamine.

Examples of the dicarboxylic acid include dicarboxylic acids having 2 to 20 carbon atoms, such as aliphatic dicarboxylic acids, aromatic dicarboxylic acids and alicyclic dicarboxylic acids.

Examples of the aliphatic dicarboxylic acids include oxalic acid, malonic acid, succinic acid, glutaric acid, methylsuccinic acid, dimethylmalonic acid, β-methylglutaric acid, ethylsuccinic acid, isopropylmalonic acid, adipic acid, pimelic acid, suberic acid, azelaic acid, sebacic acid, undecanedicarboxylic acid, dodecanedicarboxylic acid, tridecanedicarboxylic acid, tetradecanedicarboxylic acid, hexadecanedicarboxylic acid, octadecanedicarboxylic acid and eicosanedicarboxylic acid.

Examples of the aromatic dicarboxylic acids include terephthalic acid, isophthalic acid, phthalic acid, phenylmalonic acid, homophthalic acid, phenylsuccinic acid, β-phenylglutaric acid, α-phenyladipic acid, β-phenyladipic acid, biphenyl-2,2'-dicarboxylic acid, biphenyl-4,4'-dicarboxylic acid, naphthalenedicarboxylic acid, sodium 3-sulfoisophthalate, and potassium 3-sulfoisophthalate.

Examples of the alicyclic dicarboxylic acids include 1,3-cyclopentanedicarboxylic acid, 1,2-cyclopentanedicarboxylic acid, 1,4-cyclohexanedicarboxylic acid, 1,2-cyclohexanedicarboxylic acid, 1,3-cyclohexanedicarboxylic acid, 1,4-cyclohexanediacetic acid, 1,3-cyclohexanediacetic acid, 1,2-cyclohexanediacetic acid and dicyclohexyl-4,4'-dicarboxylic acid.

These active hydrogen atom-containing compounds may be used individually, or two or more thereof may be used in combination.

Next, the polycarboxylic acid compound (D) used in the present invention will be described.

Examples of the polycarboxylic acid compound (D) include carboxylic acids having three or more carboxyl groups; and carboxylic acids having two or more carboxyl groups and at least one hydroxyl group and, from the standpoints of the compatibility with thermoplastic resins and the antistatic properties, carboxylic acids having three or more carboxyl groups are preferred. The polycarboxylic acid compound (D) may be a mixture of these carboxylic acids.

The carboxylic acids having three or more carboxyl groups may be derivatives thereof (such as acid anhydrides, alkyl esters, alkali metal salts and acid halides). The carboxylic acids having three or more carboxyl groups and derivatives thereof may be used in a combination of two or more thereof.

Examples of the carboxylic acids having three or more carboxyl groups include aconitic acid, 1,2,3-propanetricarboxylic acid, butane-1,2,3,4-tetracarboxylic acid, 3-butene-1,2,3-tricarboxylic acid, trimellitic acid, pyromellitic acid, mellitic acid, cyclohexane tricarboxylic acid, naphthalene-1,2,5-tricarboxylic acid, naphthalene-2,6,7-tricarboxylic acid, 1,3,5-pentanetricarboxylic acid, trimesic acid, 3,3',4-diphenyltricarboxylic acid, benzophenone-3,3',4-tricarboxylic acid, diphenylsulfone-3,3',4-tricarboxylic acid, diphenyl ether-3,3',4-tricarboxylic acid, diphenyl-2,2',3,3'-tetracarboxylic acid, benzophenone-2,2',3,3'-tetracarboxylic acid, diphenylsulfone-2,2',3,3'-tetracarboxylic acid, diphenyl-2,2',3,3'-tetracarboxylic acid, benzophenone-2,2',3,3'-tetracarboxylic acid, diphenylsulfone-2,2',3,3'-tetracarboxylic acid and diphenyl ether-2,2',3,3'-tetracarboxylic acid, and acid-modified polyethylene waxes, polyacrylic acids and the like that have three or more carboxyl groups can also be used.

The carboxylic acids having two or more carboxyl groups and at least one hydroxyl group may be derivatives thereof (such as acid anhydrides, alkyl esters, alkali metal salts and acid halides). The carboxylic acids having two or more carboxyl groups and at least one hydroxyl group and derivatives thereof may be used in a combination of two or more thereof. Examples of the carboxylic acids having two or more carboxyl groups and at least one hydroxyl group include tartaric acid, malic acid, citric acid, isocitric acid, citramalic acid and tartronic acid.

From the standpoints of the compatibility with thermoplastic resins and the antistatic properties, it is preferred that the polymer compound (E) have a structure in which a polyester (A), which is constituted by a diol and a dicarboxylic acid, the compound (B) and the polycarboxylic acid compound (D) are bound via ester bonds.

Further, from the standpoints of the compatibility with thermoplastic resins and the antistatic properties, it is also preferred that the polymer compound (E) have a structure in which a block polymer (C) having hydroxyl groups at both ends and the above-described polycarboxylic acid compound (D) are bound via an ester bond, the block polymer (C) comprising a block constituted by the polyester (A), which is constituted by a diol and a dicarboxylic acid, and a block constituted by the compound (B) that are repeatedly and alternately bound via ester bonds.

The polyester (A) of the present invention may be any polyester as long as it is composed of a diol and a dicarboxylic acid, and it is preferred that the polyester (A) have a structure in which a residue obtained by removing a hydroxyl group from the diol and a residue obtained by removing a carboxyl group from the dicarboxylic acid are bound via an ester bond.

The polyester (A) preferably have a structure comprising carboxyl group at one or both ends, and more preferably have a structure comprising carboxyl groups at both ends. Further, the polymerization degree of the polyester (A) is preferably in a range of 2 to 50.

When the polyester (A) has a carboxyl group at one or both ends, it is preferred that the structure of the polymer compound (E) be formed by forming an ester bond by reaction between the carboxyl group of the polyester (A) and the hydroxyl group of the compound (B).

When the polyester (A) has hydroxyl groups at both ends, it is preferred that the structure of the polymer compound (E) be formed by forming an ester bond by reaction between the hydroxyl group of the polyester (A) and the carboxyl group of the compound (D).

The polyester (A) can be obtained by, for example, allowing the above-described dicarboxylic acid to undergo a polycondensation reaction with the above-described diol. The dicarboxylic acid may be a derivative (such as an acid anhydride, an alkyl ester, an alkali metal salt or an acid halide) of a dicarboxylic acid. In cases where the polyester (A) is obtained using such a derivative, the polyester (A) in this state may be directly subjected to the subsequent reaction for obtaining the block polymer (C) having a structure comprising hydroxyl groups at both ends or subjected to the subsequent reaction with polycarboxylic acid (D). Further, two or more dicarboxylic acids and derivatives thereof may be used in combination.

The polyester (A) having carboxyl groups at both ends can be obtained by, for example, allowing the above-described dicarboxylic acid or derivative thereof to undergo a polycondensation reaction with the above-described diol. As for the reaction ratio of the dicarboxylic acid or derivative thereof with respect to the diol in this case, it is preferred that the dicarboxylic acid or derivative thereof be used in an excess amount, preferably in an excess of 1 mole in terms of molar ratio with respect to the diol, such that the resulting polyester has carboxyl groups at both ends.

The polyester (A) having a carboxyl group at one end can be obtained by, for example, allowing the above-described dicarboxylic acid or derivative thereof and the above-described diol to undergo a polycondensation reaction. In this case, as for the reaction ratio between the dicarboxylic acid or derivative thereof and the diol, it is preferred that the dicarboxylic acid or derivative thereof and the diol be used in equivalent amounts in terms of molar ratio such that one end of the resulting polyester is a carboxyl group.

The polyester (A) having hydroxyl groups at both ends can be obtained by, for example, allowing the above-described dicarboxylic acid or derivative thereof and the above-described diol to undergo a polycondensation reaction. In this case, as for the reaction ratio between the dicarboxylic acid or derivative thereof and the diol, it is preferred that the diol be used in an excess amount, particularly in an excess of 1 mole in terms of molar ratio with respect to the dicarboxylic acid, such that the resulting polyester has hydroxyl groups at both ends.

The polyester (A) may be a mixture of such polyesters.

In the polycondensation reaction, a catalyst which promotes esterification reaction may be used and, as such a catalyst, a conventionally known catalyst such as dibutyl tin oxide, tetraalkyl titanate, zirconium acetate or zinc acetate can be employed.

In cases where a derivative such as a carboxylic acid ester, metal carboxylate or carboxylic acid halide is used in place of the dicarboxylic acid, after the derivative and the diol are allowed to react with each other, both ends of the resultant may be treated to be dicarboxylic acids, or the resultant may be directly subjected to a reaction for obtaining the block polymer (C) having a structure comprising carboxyl groups at both ends.

A preferred polyester (A), which is composed of a diol and a dicarboxylic acid and has carboxyl groups at both ends, may be any polyester as long as it reacts with the component (B) to form an ester bond and thereby constitutes the structure of the block polymer (C), and the carboxyl groups at both ends may be protected or modified, or may be in a precursor form. Further, in order to inhibit oxidation of the product during the reaction, an antioxidant such as a phenolic antioxidant may also be added to the reaction system.

The compound (B) having hydroxyl groups at both ends may be any compound as long as it reacts with the component (A) to form an ester bond and thereby constitutes the structure of the block polymer (C). The hydroxyl groups at both ends may be protected or modified, or may be in a precursor form.

The block polymer (C) according to the present invention, which has a structure comprising hydroxyl groups at both ends, contains a block constituted by the polyester (A) and a block constituted by the compound (B) and has a structure in which these blocks are repeatedly and alternately bound via ester bonds formed by carboxyl groups and hydroxyl groups. One example of the block polymer (C) is a block polymer having a structure represented by the following Formula (3):

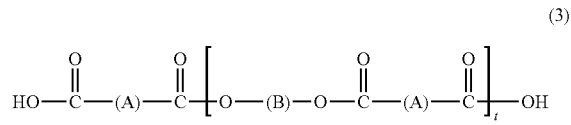

In the Formula (3), (A) represents a block constituted by the polyester (A) having carboxyl groups at both ends; (B) represents a block constituted by the compound (B) having hydroxyl groups at both ends; and t represents the number of repeating units, which is preferably 1 to 10, more preferably 1 to 7, most preferably 1 to 5.

The block polymer (C) having a structure comprising hydroxyl groups at both ends can be obtained by allowing the polyester (A) having carboxyl groups at both ends and the compound (B) having hydroxyl groups at both ends to undergo a polycondensation reaction; however, as long as the block polymer (C) has a structure that is equivalent to the one in which the polyester (A) and the compound (B) are repeatedly and alternately bound via ester bonds formed by carboxyl groups and hydroxyl groups, it is not necessarily required that the block polymer (C) be synthesized from the polyester (A) and the compound (B).

As for the reaction ratio between the polyester (A) and the compound (B), by adjusting the amount of the compound (B) to be (X+1) mol with respect to X mol of the polyester (A), the block polymer (C) having hydroxyl groups at both ends can be preferably obtained.

As for the reaction, after the completion of the synthesis reaction of the polyester (A), without the thus synthesized polyester (A) being isolated, the compound (B) may be added to the reaction system and allowed to react with the polyester (A) as is.

In the polycondensation reaction, a catalyst which promotes esterification reaction may be used and, as such a catalyst, a conventionally known catalyst such as dibutyl tin oxide, tetraalkyl titanate, zirconium acetate or zinc acetate can be employed. Further, in order to inhibit oxidation of the product during the reaction, an antioxidant such as a phenolic antioxidant may also be added to the reaction system.

It is preferred that the polymer compound (E) according to the present invention have a structure in which the block polymer (C) having a structure comprising hydroxyl groups at both ends and the polycarboxylic acid compound (D) are bound via an ester bond formed by a terminal hydroxyl group of the block polymer (C) and a carboxyl group of the polycarboxylic acid compound (D). The polymer compound (E) may further comprise an ester bond formed by a hydroxyl group of the polyester (A) and a carboxyl group of the polycarboxylic acid compound (D).

In order to obtain the polymer compound (E), the hydroxyl groups of the block polymer (C) and the carboxyl groups of the polycarboxylic acid compound (D) can be allowed to react with each other. The number of the carboxyl groups of the polycarboxylic acid compound is preferably 0.5 to 5 equivalents, more preferably 0.5 to 1.5 equivalents, with respect to the number of the hydroxyl groups of the block polymer (C) to be reacted. Further, the reaction can be performed in a variety of solvents, or it may be performed in a molten state.

The amount of the polycarboxylic acid compound (D) to be used in the reaction is preferably 0.1 to 2.0 equivalents, more preferably 0.2 to 1.5 equivalents, with respect to the number of the hydroxyl groups of the block polymer (C) to be reacted.

As for the reaction, after the completion of the synthesis reaction of the block polymer (C), without the thus synthesized block polymer (C) being isolated, the polycarboxylic acid compound (D) may be added to the reaction system and allowed to react with the block polymer (C) as is. In this case, unreacted hydroxyl groups of the polyester (A) used in an excess amount in the synthesis of the block polymer (C) may react with some of the carboxyl groups of the polycarboxylic acid compound (D) to form ester bonds.

It is not necessarily required that a preferred polymer compound (E) of the present invention be synthesized from the block polymer (C) and the polycarboxylic acid compound (D), as long as the polymer compound (E) has a structure that is equivalent to the one in which the block polymer (C) having a structure comprising hydroxyl groups at both ends and the polycarboxylic acid compound (D) are bound via an ester bond formed by a hydroxyl group of the block polymer (C) and a carboxyl group of the polycarboxylic acid compound (D).

In the polymer compound (E) of the present invention, the block constituted by the polyester (A) has a number-average molecular weight of preferably 800 to 8,000, more preferably 1,000 to 6,000, still more preferably 2,000 to 4,000, in terms of polystyrene. In the polymer compound (E), the block constituted by the compound (B) having hydroxyl groups at both ends has a number-average molecular weight of preferably 400 to 6,000, more preferably 1,000 to 5,000, still more preferably 2,000 to 4,000, in terms of polystyrene. Further, in the polymer compound (E), the block constituted by the block polymer (C) having a structure comprising hydroxyl groups at both ends has a number-average molecular weight of preferably 5,000 to 25,000, more preferably 7,000 to 17,000, still more preferably 9,000 to 13,000, in terms of polystyrene.

It is also preferred that at least one selected from the group consisting of alkali metal salts and Group II metal salts be further incorporated into the antistatic agent of the present invention to obtain an antistatic agent composition.

Examples of the alkali metal salts and Group II element salts include those of organic acids and inorganic acids. Examples of the alkali metal include lithium, sodium, potassium, cesium and rubidium, and examples of the Group II element include beryllium, magnesium, calcium, strontium and barium. Further, examples of the organic acids include aliphatic monocarboxylic acids having 1 to 18 carbon atoms, such as formic acid, acetic acid, propionic acid, butyric acid and lactic acid; aliphatic dicarboxylic acids having 1 to 12 carbon atoms, such as oxalic acid, malonic acid, succinic acid, fumaric acid, maleic acid and adipic acid; aromatic carboxylic acids, such as benzoic acid, phthalic acid, isophthalic acid, terephthalic acid and salicylic acid; and sulfonic acids having 1 to 20 carbon atoms, such as methanesulfonic acid, p-toluenesulfonic acid, dodecylbenzenesulfonic acid and trifluoromethanesulfonic acid, and examples of the inorganic acids include hydrochloric acid, hydrobromic acid, sulfuric acid, sulfurous acid, phosphoric acid, phosphorous acid, polyphosphoric acid, nitric acid and perchloric acid. Thereamong, from the standpoint of antistatic properties, alkali metal salts are preferred, salts of lithium, sodium and potassium are more preferred, and salts of lithium are most preferred. Further, from the standpoint of antistatic properties, acetates, perchlorates, p-toluenesulfonates and dodecylbenzenesulfonates are preferred.

Specific examples of the alkali metal salts and Group II element salts include lithium acetate, sodium acetate, potassium acetate, lithium chloride, sodium chloride, potassium chloride, magnesium chloride, calcium chloride, lithium phosphate, sodium phosphate, potassium phosphate, lithium sulfate, sodium sulfate, magnesium sulfate, calcium sulfate, lithium perchlorate, sodium perchlorate, potassium perchlorate, lithium p-toluenesulfonate, sodium p-toluenesulfonate, potassium p-toluenesulfonate, lithium dodecylbenzenesulfonate, sodium dodecylbenzenesulfonate and potassium dodecylbenzenesulfonate. Thereamong, for example, lithium acetate, potassium acetate, lithium p-toluenesulfonate, sodium p-toluenesulfonate and lithium chloride are preferred.

The above-described alkali metal salt(s) and/or Group II element salt(s) may be incorporated into the polymer compound (E) used in the antistatic agent of the present invention, or may be incorporated into a thermoplastic resin along with the polymer compound (E). The amount of the alkali metal salt(s) and/or Group II metal salt(s) to be incorporated is preferably 0.01 to 20 parts by mass, more preferably 0.1 to 15 parts by mass, most preferably 1 to 10 parts by mass, with respect to 100 parts by mass of the polymer compound (E).

Further, a surfactant may also be incorporated into the antistatic agent of the present invention to use the resultant as an antistatic agent composition. As the surfactant, a nonionic, anionic, cationic or amphoteric surfactant can be employed. Examples of the nonionic surfactant include polyethylene glycol-type nonionic surfactants, such as higher alcohol ethylene oxide adducts, fatty acid ethylene oxide adducts, higher alkylamine ethylene oxide adducts and polypropylene glycol ethylene oxide adducts; and polyhydric alcohol-type nonionic surfactants, such as polyethylene oxides, glycerin fatty acid esters, pentaerythritol fatty acid esters, fatty acid esters of sorbitol or sorbitan, polyhydric alcohol alkyl ethers and alkanolamine aliphatic amides, and examples of the anionic surfactant include carboxylates such as alkali metal salts of higher fatty acids; sulfates such as higher alcohol sulfates and higher alkyl ether sulfates; sulfonates such as alkylbenzenesulfonates, alkylsulfonates and paraffin sulfonates; and phosphates such as higher alcohol phosphates. Examples of the cationic surfactant include quaternary ammonium salts such as alkyltrimethylammonium salts, and examples of the amphoteric surfactant include amino acid-type amphoteric surfactants such as higher alkylaminopropionates; and betaine-type amphoteric surfactants such as higher alkyl dimethylbetaines and higher alkyl dihydroxyethylbetaines. These surfactants may be used individually, or two or more thereof may be used in combination. In the present invention, among the above-described surfactants, anionic surfactants are preferred, and sulfonates such as alkylbenzenesulfonates, alkylsulfonates and paraffin sulfonates are particularly preferred.

The surfactant(s) may be incorporated into the polymer compound (E) used in the antistatic agent of the present invention, or may be incorporated into a thermoplastic resin along with the polymer compound (E). The amount of the surfactant(s) to be incorporated is preferably 0.01 to 20 parts by mass, more preferably 0.1 to 15 parts by mass, most preferably 1 to 10 parts by mass, with respect to 100 parts by mass of the polymer compound (E).

Further, a polymer-type antistatic agent may also be incorporated into the antistatic agent of the present invention to use the resultant as an antistatic agent composition. As the polymer-type antistatic agent, for example, a known polymer-type antistatic agent such as a polyether ester amide can be used, and examples thereof include the polyether ester amide disclosed in Japanese Unexamined Patent Application Publication No. H7-10989 which comprises a polyoxyalkylene adduct of bisphenol A. Further, a block polymer having 2 to 50 repeating structures each composed of a polyolefin block and a hydrophilic polymer block can also be used, and examples thereof include the block polymer disclosed in the specification of U.S. Pat. No. 6,552,131.

The polymer-type antistatic agent may be incorporated into the polymer compound (E) used in the antistatic agent of the present invention, or it may be incorporated in a thermoplastic resin along with the polymer compound (E). The amount of the polymer-type antistatic agent to be incorporated is preferably 0 to 50 parts by mass, more preferably 5 to 20 parts by mass, with respect to 100 parts by mass of the polymer compound (E).

Still further, the antistatic agent of the present invention may also be blended with an ionic liquid to use the resultant as an antistatic agent composition. The ionic liquid is, for example, a normal temperature-molten salt having a melting point of not higher than room temperature and an initial electrical conductivity of 1 to 200 ms/cm, preferably 10 to 200 ms/cm, in which at least one cation or anion constituting the ionic liquid is an organic ion. Examples of such a normal temperature-molten salt include the one disclosed in WO 95/15572.

The cation constituting the ionic liquid is, for example, one selected from the group consisting of amidinium, pyridinium, pyrazolium and guanidinium cations.

Thereamong, examples of the amidinium cation include the followings:
(1) imidazolinium cations
  those having 5 to 15 carbon atoms, such as 1,2,3,4-tetramethylimidazolinium and 1,3-dimethylimidazolinium;
(2) imidazolium cations
  those having 5 to 15 carbon atoms, such as 1,3-dimethylimidazolium and 1-ethyl-3-methylimidazolium;
(3) tetrahydropyrimidinium cations
  those having 6 to 15 carbon atoms, such as 1,3-dimethyl-1,4,5,6-tetrahydropyrimidinium and 1,2,3,4-tetramethyl-1,4,5,6-tetrahydropyrimidinium; and
(4) dihydropyrimidinium cations
  those having 6 to 20 carbon atoms, such as 1,3-dimethyl-1,4-dihydropyrimidinium, 1,3-dimethyl-1,6-dihydropyrimidinium, 8-methyl-1,8-diazabicyclo[5,4,0]-7,9-undecadienium and 8-methyl-1,8-diazabicyclo[5,4,0]-7,10-undecadienium.

Examples of the pyridinium cation include those having 6 to 20 carbon atoms, such as 3-methyl-1-propylpyridinium and 1-butyl-3,4-dimethylpyridinium.

Examples of the pyrazolium cation include those having 5 to 15 carbon atoms, such as 1,2-dimethylpyrazolium and 1-n-butyl-2-methylpyrazolium.

Examples of the guanidinium cation include the followings:
(1) guanidinium cations having an imidazolinium skeleton
  those having 8 to 15 carbon atoms, such as 2-dimethylamino-1,3,4-trimethylimidazolinium and 2-diethylamino-1,3,4-trimethylimidazolinium;
(2) guanidinium cations having an imidazolium skeleton
  those having 8 to 15 carbon atoms, such as 2-dimethylamino-1,3,4-trimethylimidazolium and 2-diethylamino-1,3,4-trimethylimidazolium;
(3) guanidinium cations having a tetrahydropyrimidinium skeleton
  those having 10 to 20 carbon atoms, such as 2-dimethylamino-1,3,4-trimethyl-1,4,5,6-tetrahydropyrimidinium and 2-diethylamino-1,3-dimethyl-4-ethyl-1,4,5,6-tetrahydropyrimidinium; and
(4) guanidinium cations having a dihydropyrimidinium skeleton
  those having 10 to 20 carbon atoms, such as 2-dimethylamino-1,3,4-trimethyl-1,4-dihydropyrimidinium, 2-dimethylamino-1,3,4-trimethyl-1,6-dihydropyrimidinium, 2-diethylamino-1,3-dimethyl-4-ethyl-1,4-dihydropyrimidinium and 2-diethylamino-1,3-dimethyl-4-ethyl-1,6-dihydropyrimidinium.

The above-described cations may be used individually, or two or more thereof may be used in combination. Thereamong, from the standpoint of antistatic properties, amidinium cations are preferred, imidazolium cations are more preferred, and 1-ethyl-3-methylimidazolium cation is particularly preferred.

In the ionic liquid, examples of the organic or inorganic acid constituting the anion include the followings. Examples of the organic acid include carboxylic acid, sulfuric acid ester, sulfonic acid and phosphoric acid ester, and examples of the inorganic acid include superacids (such as fluoroboric acid, tetrafluoroboric acid, perchloric acid, hexafluorophosphoric acid, hexafluoroantimonic acid and hexafluoroarsenic acid), phosphoric acid and boric acid. These organic and inorganic acids may be used individually, or two or more thereof may be used in combination.

Among these organic and inorganic acids, from the standpoint of the antistatic properties of the ionic liquid, acids forming a conjugate base of superacid or an anion other than a conjugate base of super acid, which allow the anion constituting the ionic liquid to have a Hammett acidity function ($-H_0$) of 12 to 100, and mixtures of such acids are preferred.

Examples of the anion other than a conjugate base of superacid include halogen (such as fluorine, chlorine and bromine) ions, alkyl (C1-12) benzenesulfonic acid (such as p-toluenesulfonic acid and dodecylbenzenesulfonic acid) ions, and poly (n=1 to 25) fluoroalkanesulfonic acid (such as undecafluoropentanesulfonic acid) ions.

Examples of the superacid include those derived from a protonic acid or a combination of a protonic acid and a Lewis acid, and mixtures thereof. Examples of the protonic acid used as the superacid include bis(trifluoromethylsulfonyl)imidic acid, bis(pentafluoroethylsulfonyl)imidic acid, tris(trifluoromethylsulfonyl)methane, perchloric acid, fluorosulfonic acid, alkane (C1 to C30) sulfonic acids (such as methanesulfonic acid and dodecanesulfonic acid), poly (n=1 to 30) fluoroalkane (C1 to C30) sulfonic acid (such as trifluoromethanesulfonic acid, pentafluoroethanesulfonic acid, heptafluoropropanesulfonic acid, nonafluorobutanesulfonic acid, undecafluoropentanesulfonic acid and tridecafluorohexanesulfonic acid), fluoroboric acid and tetrafluoroboric acid. Thereamong, from the standpoint of the ease of synthesis, fluoroboric acid, trifluoromethanesulfonic acid, bis(trifluoromethanesulfonyl)imidic acid and bis(pentafluoroethylsulfonyl)imidic acid are preferred.

Examples of the protonic acid used in combination with a Lewis acid include hydrogen halides (such as hydrogen fluoride, hydrogen chloride, hydrogen bromide and hydrogen iodide), perchloric acid, fluorosulfonic acid, methanesulfonic acid, trifluoromethanesulfonic acid, pentafluoroethanesulfonic acid, nonafluorobutanesulfonic acid, undecafluoropentanesulfonic acid, tridecafluorohexanesulfonic acid, and mixtures thereof. Thereamong, from the standpoint of the initial electrical conductivity of the ionic liquid, hydrogen fluoride is preferred.

Examples of the Lewis acid include boron trifluoride, phosphorus pentafluoride, antimony pentafluoride, arsenic pentafluoride, tantalum pentafluoride, and mixtures thereof. Thereamong, from the standpoint of the initial electrical conductivity of the ionic liquid, boron trifluoride and phosphorus pentafluoride are preferred.

The combination of a protonic acid and a Lewis acid may be any combination, and examples of a superacid derived therefrom include tetrafluoroboric acid, hexafluorophosphoric acid, hexafluorotantalic acid, hexafluoroantimonic acid, hexafluorotantalum sulfonic acid, tetrafluoroboric acid, hexafluorophosphoric acid, chlorotrifluoroboric acid, hexafluoroarsenic acid, and mixtures thereof.

Among the above-described anions, from the standpoint of the antistatic properties of the ionic liquid, conjugate bases of superacids (superacids derived from a protonic acid and superacids derived from a combination of a protonic acid and a Lewis acid) are preferred, and superacids derived from a protonic acid and conjugate bases of superacids derived from a protonic acid, boron trifluoride and/or phosphorus pentafluoride are more preferred.

Among the above-described ionic liquids, from the standpoint of the antistatic properties, amidinium cation-containing ionic liquids are preferred, 1-ethyl-3-methylimidazolium cation-containing ionic liquids are more preferred, and 1-ethyl-3-methylimidazolium-bis(trifluoromethanesulfonyl)imide is particularly preferred.

The amount of the ionic liquid to be blended is preferably 0.01 to 20 parts by mass, more preferably 0.1 to 15 parts by mass, most preferably 1 to 10 parts by mass, with respect to 100 parts by mass of the polymer compound (E).

Yet still further, a compatibilizer may also be incorporated into the antistatic agent of the present invention to use the resultant as an antistatic agent composition. By incorporating a compatibilizer, the compatibility of the antistatic agent component with other components and a thermoplastic resin can be improved. Examples of such a compatibilizer include modified vinyl polymers having at least one functional group (polar group) selected from the group consisting of a carboxyl group, an epoxy group, an amino group, a hydroxyl group and a polyoxyalkylene group, such as the polymer disclosed in Japanese Unexamined Patent Application Publication No. H3-258850, the sulfonyl group-containing modified vinyl polymer disclosed in Japanese Unexamined Patent Application Publication No. H6-345927 and block polymers comprising a polyolefin moiety and an aromatic vinyl polymer moiety.

The compatibilizer may be incorporated into the polymer compound (E) used in the antistatic agent of the present invention, or it may be incorporated into a thermoplastic resin along with the polymer compound (E). The amount of the compatibilizer to be incorporated is preferably 0.1 to 15 parts by mass, more preferably 1 to 10 parts by mass, with respect to 100 parts by mass of the polymer compound (E).

The antistatic agent of the present invention and the antistatic agent composition of the present invention can each be particularly preferably incorporated into a thermoplastic resin to use the resultant as an antistatic resin composition. Examples of the thermoplastic resin include α-olefin polymers such as polypropylene, high-density polyethylene, low-density polyethylene, linear low-density polyethylene, cross-linked polyethylene, ultrahigh-molecular-weight polyethylene, polybutene-1, poly-3-methylpentene and poly-4-methylpentene; polyolefin-based resins and copolymers thereof, such as ethylene-vinyl acetate copolymers, ethylene-ethyl acrylate copolymers and ethylene-propylene copolymers; halogen-containing resins, such as polyvinyl chloride, polyvinylidene chloride, chlorinated polyethylene, chlorinated polypropylene, polyvinylidene fluoride, chlorinated rubbers, vinyl chloride-vinyl acetate copolymers, vinyl chloride-ethylene copolymers, vinyl chloride-vinylidene chloride copolymers, vinyl chloride-vinylidene chloride-vinyl acetate ternary copolymers, vinyl chloride-acrylate copolymers, vinyl chloride-maleate copolymers and vinyl chloride-cyclohexylmaleimide copolymers; petroleum resins; coumarone resins; polystyrene; polyvinyl acetate; acrylic resins; copolymers (e.g., AS resins, ABS (Acrylonitrile-Butadiene-Stylene copolymer) resins, ACS resins, SBS resins, MBS resins and heat-resistant ABS resins) composed of styrene and/or α-methylstyrene with other monomer (e.g., maleic anhydride, phenylmaleimide, methyl methacrylate, butadiene or acrylonitrile); polymethyl methacrylates; polyvinyl alcohols; polyvinyl formals; polyvinyl butyrals; aromatic polyesters including polyalkylene terephthalates, such as polyethylene terephthalate, polybutylene terephthalate and polycyclohexane dimethylene terephthalate, and polyalkylene naphthalates such as polyethylene naphthalate and polybutylene naphthalate, and linear polyesters such as polytetramethylene terephthalate; degradable aliphatic polyesters such as polyhydroxy butyrate, polycaprolactone, polybutylene succinate, polyethylene succinate, polylactic acid, polymalic acid, polyglycolic acid, polydioxane and poly(2-oxetanone); and thermoplastic resins and blends thereof, such as polyamides (e.g., polyphenylene oxide, polycaprolactam and polyhexamethylene adipamide), polycarbonates, polycarbonate/ABS resins, branched polycarbonates, polyacetals, polyphenylene sulfides, polyurethanes, cellulose-based resins, polyimide resins, polysulfones, polyphenylene ethers, polyether ketones, polyether ether ketones and liquid crystal polymers. Further, the thermoplastic resin may be an elastomer, such as an isoprene rubber, a butadiene rubber, an acrylonitrile-butadiene copolymer rubber, a styrene-butadiene copolymer rubber, a fluorine rubber, a silicone rubber, an olefin-based elastomer, a styrene-based elastomer, a polyester-based elastomer, a nitrile-based elastomer, a nylon-based elastomer, a vinyl chloride-based elastomer, a polyamide-based elastomer or a polyurethane-based elastomer. In the present invention, these thermoplastic resins may be used individually, or two or more thereof may be used in combination. Moreover, these thermoplastic resins may be alloyed as well.

These thermoplastic resins can be used regardless of molecular weight, polymerization degree, density, softening point, ratio of solvent-insoluble component(s), degree of stereoregularity, presence or absence of catalyst residue, type and blend ratio of each material monomer, type of polymerization catalyst (e.g., a Ziegler catalyst or a metallocene catalyst). Among the above-described thermoplastic resins, from the standpoint of the antistatic properties, one or more selected from the group consisting of polyolefin-based resins, polystyrene-based resins and copolymers thereof are preferably used.

In the antistatic resin composition of the present invention, the mass ratio of the thermoplastic resin(s) and the antistatic agent or the antistatic agent composition is preferably in a range of 99/1 to 40/60.

The method of incorporating the polymer compound (E) into a thermoplastic resin is not particularly restricted, and any commonly used method can be employed. For example, the polymer compound (E) can be mixed and kneaded into the thermoplastic resin by roll kneading or bumper kneading, or using an extruder or a kneader. Further, the polymer compound (E) may be directly added to the thermoplastic resin; however, as required, the polymer compound (E) may be impregnated into a carrier before the addition. In order to impregnate the polymer compound (E) into a carrier, the polymer compound (E) and the carrier can be directly heat-mixed, or a method in which the polymer compound (E) is diluted with an organic solvent before being impregnated into the carrier and the solvent is subsequently removed can be employed as required. As the carrier, one which is known as a filler or bulking agent of a synthetic resin, or a flame retardant or light stabilizer that is solid at normal temperature can be employed, and examples of such a carrier include calcium silicate powder, silica powder, talc powder, alumina powder, titanium oxide powder, and these carriers having chemically modified surface, as well as the below-described flame retardants and antioxidants that are solid. Thereamong, those carriers having chemically modified surface are preferred, and silica powder having chemically modified surface is more preferred. These carriers have an average particle size of preferably 0.1 to 100 μm, more preferably 0.5 to 50 μm.

As the method of incorporating the polymer compound (E) into a thermoplastic resin, the polymer compound (E) may be synthesized by kneading the block polymer (C) and the polycarboxylic acid compound (D) simultaneously with the thermoplastic resin. Alternatively, the polymer compound (E) may be incorporated using a method of obtaining a molded article by mixing the polymer compound (E) and the thermoplastic resin at the time of molding such as injection molding, or a masterbatch of the polymer compound (E) and the thermoplastic resin, which has been produced in advance, may be incorporated.

To the antistatic resin composition of the present invention, as required, a variety of additives such as a phenolic antioxidant, a phosphorus-based antioxidant, a thioether-based antioxidant, an ultraviolet absorber and a hindered amine-based light stabilizer may also be added. By this, the resin composition of the present invention can be stabilized.

Examples of the phenolic antioxidants include 2,6-di-tert-butyl-p-cresol, 2,6-diphenyl-4-octadecyloxyphenol, distearyl(3,5-di-tert-butyl-4-hydroxybenzyl)phosphonate, 1,6-hexamethylene-bis[(3,5-di-tert-butyl-4-hydroxyphenyl) propionic acid amide], 4,4'-thiobis(6-tert-butyl-m-cresol), 2,2'-methylene-bis(4-methyl-6-tert-butylphenol), 2,2'-methylene-bis(4-ethyl-6-tert-butylphenol), 4,4'-butylidene-bis(6-tert-butyl-m-cresol), 2,2'-ethylidene-bis(4,6-di-tert-butylphenol), 2,2'-ethylidene-bis(4-sec-butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl)phenol, stearyl(3, 5-di-tert-butyl-4-hydroxyphenyl)propionate, tetrakis[3-(3,5-di-tert-butyl-4-hydroxyphenyl)propionic acid methyl] methane, thiodiethylene glycol-bis[(3,5-di-tert-butyl-4-hydroxyphenyl)propionate], 1,6-hexamethylene-bis[(3,5-di-tert-butyl-4-hydroxyphenyl)propionate], bis[3,3-bis(4-hydroxy-3-tert-butylphenyl)butyric acid]glycol ester, bis[2-tert-butyl-4-methyl-6-(2-hydroxy-3-tert-butyl-5-methylbenzyl)phenyl]terephthalate, 1,3,5-tris[(3,5-di-tert-butyl-4-hydroxyphenyl)propionyloxyethyl]isocyanurate, 3,9-bis[1,1-dimethyl-2-{(3-tert-butyl-4-hydroxy-5-methylphenyl)propionyloxy}ethyl]-2,4,8,10-tetraoxaspiro[5,5]undecane, and triethylene glycol-bis[(3-tert-butyl-4-hydroxy-5-methylphenyl)propionate]. These phenolic antioxidants are added in an amount of preferably 0.001 to 10 parts by mass, more preferably 0.05 to 5 parts by mass, with respect to 100 parts by mass of the thermoplastic resin.

Examples of the phosphorus-based antioxidants include trisnonylphenyl phosphite, tris[2-tert-butyl-4-(3-tert-butyl-4-hydroxy-5-methylphenylthio)-5-methylphenyl]phosphite, tridecyl phosphite, octyldiphenyl phosphite, di(decyl)monophenyl phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetra(tridecyl) isopropylidenediphenol diphosphite, tetra(tridecyl)-4,4'-n-butylidene-bis(2-tert-butyl-5-methylphenol)diphosphite, hexa(tridecyl)-1,1,3-tris(2-methyl-4-hydroxy-5-tert-butylphenyl)butane triphosphite, tetrakis(2,4-di-tert-butylphenyl) biphenylene diphosphonite, 9,10-dihydro-9-oxa-10-phosphaphenanthrene-10-oxide, 2,2'-methylene-bis(4,6-tert-butylphenyl)-2-ethylhexyl phosphite, 2,2'-methylene-bis(4,6-tert-butylphenyl)-octadecyl phosphite, 2,2'-ethylidene-bis(4,6-di-tert-butylphenyl)fluorophosphite, tris(2-[(2,4,8,10-tetrakis-tert-butyldibenzo[d,f][1,3,2]dioxaphosphepin-6-yl)oxy]ethyl)amine, and phosphite of 2-ethyl-2-butylpropylene glycol and 2,4,6-tri-tert-butylphenol. These phosphorus-based antioxidants are added in an amount of preferably 0.001 to 10 parts by mass, more preferably 0.05 to 5 parts by mass, with respect to 100 parts by mass of the thermoplastic resin.

Examples of the thioether-based antioxidants include dialkyl thiodipropionates such as dilauryl thiodipropionate, dimyristyl thiodipropionate and distearyl thiodipropionate; and pentaerythritol-tetra(β-alkylthiopropionic acid)esters. These thioether-based antioxidants are added in an amount of preferably 0.001 to 10 parts by mass, more preferably 0.05 to 5 parts by mass, with respect to 100 parts by mass of the thermoplastic resin.

Examples of the ultraviolet absorbers include 2-hydroxybenzophenones such as 2,4-dihydroxybenzophenone, 2-hydroxy-4-methoxybenzophenone, 2-hydroxy-4-octoxybenzophenone and 5,5'-methylene-bis(2-hydroxy-4-methoxybenzophenone); 2-(2'-hydroxyphenyl) benzotriazoles such as 2-(2'-hydroxy-5'-methylphenyl) benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole, 2,2'-methylene-bis(4-tert-octyl-6-(benzotriazolyl)phenol) and 2-(2'-hydroxy-3'-tert-butyl-5'-carboxyphenyl)benzotriazole; benzoates such as phenyl salicylate, resorcinol monobenzoate, 2,4-di-tert-butylphenyl-3,5-di-tert-butyl-4-hydroxybenzoate, 2,4-di-tert-amylphenyl-3,5-di-tert-butyl-4-hydroxybenzoate and hexadecyl-3,5-di-tert-butyl-4-hydroxybenzoate; substituted oxanilides such as 2-ethyl-2'-ethoxyoxanilide and 2-ethoxy-4'-dodecyloxanilide; cyanoacrylates such as ethyl-α-cyano-β,β-diphenyl acrylate and methyl-2-cyano-3-methyl-3-(p-methoxyphenyl)acrylate; and triaryl triazines such as 2-(2-hydroxy-4-octoxyphenyl)-4,6-bis(2,4-di-tert-butylphenyl)-s-triazine, 2-(2-hydroxy-4-methoxyphenyl)-4,6-diphenyl-s-triazine and 2-(2-hydroxy-4-propoxy-5-methylphenyl)-4,6-bis(2,4-di-tert-butylphenyl)-s-triazine. These ultraviolet absorbers are added in an amount of preferably 0.001 to 30 parts by mass, more preferably 0.05 to 10 parts by mass, with respect to 100 parts by mass of the thermoplastic resin.

Examples of the hindered amine-based light stabilizers include hindered amine compounds such as 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis(1,2,2,6,6-tetramethyl-4-piperidyl)sebacate, bis(1-oxtoxy-2,2,6,6-tetramethyl-4-piperidyl)sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl).di(tridecyl)-1,2,3,4-butanetetracarboxylate, bis(1,2,2,6,6-pentamethyl-4-piperidyl).di(tridecyl)-1,2,3,4-butanetetracarboxylate, bis(1,2,2,4,4-pentamethyl-4-piperidyl)-2-butyl-2-(3,5-di-tert-butyl-4-hydroxybenzyl) malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidyl) amino)-s-triazine-6-yl]-1,5,8,12-tetraazadodecane, 1,6,11-tris[2,4-bis(N-butyl-N-(2,2,6,6-tetramethyl-4-piperidyl) amino)-s-triazine-6-yl]aminoun decane and 1,6,11-tris[2,4-bis(N-butyl-N-(1,2,2,6,6-pentamethyl-4-piperidyl)amino)-s-triazine-6-yl]amino undecane. These hindered amine-based light stabilizers are added in an amount of preferably 0.001 to 30 parts by mass, more preferably 0.05 to 10 parts by mass, with respect to 100 parts by mass of the thermoplastic resin.

In cases where a polyolefin-based resin is used as the thermoplastic resin, in order to neutralize residual catalyst in the polyolefin resin, it is preferred to further add a known neutralizer as required. Examples of the neutralizer include fatty acid metal salts such as calcium stearate, lithium stearate and sodium stearate; and fatty acid amide compounds such as ethylene-bis(stearamide), ethylene-bis(12-hydroxystearamide) and stearic acid amide, and these neutralizers may be used in combination.

Further, to the antistatic resin composition of the present invention, as required, for example, a nucleating agent (e.g., an aromatic metal carboxylate, an alicyclic metal alkylcarboxylate, aluminum p-tert-butylbenzoate, an aromatic metal phosphate or a kind of dibenzylidene sorbitol), a metallic soap, a hydrotalcite, a triazine ring-containing compound, a metal hydroxide, a phosphoric acid ester-based flame retardant, a condensed phosphoric acid ester-based flame retardant, a phosphate-based flame retardant, an inorganic phosphorus-based flame retardant, a (poly)phosphate-based flame retardant, a halogen-based flame retardant, a silicon-based flame retardant, an antimony oxide such as antimony trioxide, other inorganic flame retardant aid, other organic flame retardant aid, a filler, a pigment, a lubricant, and/or a foaming agent, may also be added.

Examples of the triazine ring-containing compounds include melamine, ammeline, benzoguanamine, acetoguanamine, phthalodiguanamine, melamine cyanurate, melamine pyrophosphate, butylene diguanamine, norbornene diguanamine, methylene diguanamine, ethylene dimelamine, trimethylene dimelamine, tetramethylene dimelamine, hexamethylene dimelamine and 1,3-hexylene dimelamine.

Examples of the metal hydroxides include magnesium hydroxide, aluminum hydroxide, calcium hydroxide, barium hydroxide, zinc hydroxide and KISUMA 5A (magnesium hydroxide, manufactured by Kyowa Chemical Industry Co., Ltd.).

Examples of the phosphate-based flame retardants include trimethyl phosphate, triethyl phosphate, tributyl phosphate, tributoxyethyl phosphate, trischloroethyl phosphate, trisdichloropropyl phosphate, triphenyl phosphate, tricresyl phosphate, cresyldiphenyl phosphate, trixylenyl phosphate, octyldiphenyl phosphate, xylenyldiphenyl phosphate, tris(isopropylphenyl) phosphate, 2-ethylhexyldiphenyl phosphate, t-butylphenyldiphenyl phosphate, bis(t-butylphenyl) phenyl phosphate, tris(t-butylphenyl)phosphate, isopropylphenyldiphenyl phosphate, bis(isopropylphenyl)diphenyl phosphate and tris(isopropylphenyl)phosphate.

Examples of the condensed phosphoric acid ester-based flame retardants include 1,3-phenylene-bis(diphenylphosphate), 1,3-phenylene-bis(dixylenylphosphate) and bisphenol A-bis(diphenylphosphate).

Examples of the (poly)phosphate-based flame retardants include ammonium salts and amine salts of (poly)phosphoric acid, such as ammonium polyphosphate, melamine polyphosphate, piperazine polyphosphate, melamine pyrophosphate and piperazine pyrophosphate.

Examples of the other inorganic flame retardant aids include inorganic compounds such as titanium oxide, aluminum oxide, magnesium oxide, hydrotalcites, talc and montmorillonite, and surface-treated products thereof. For example, a variety of commercially available products, such as TIPAQUE R-680 (titanium oxide: manufactured by Ishihara Sangyo Kaisha, Ltd.), KYOWAMAG 150 (magnesium oxide: manufactured by Kyowa Chemical Industry Co., Ltd.), DHT-4A (hydrotalcite: manufactured by Kyowa Chemical Industry Co., Ltd.) and ALCAMIZER 4 (zinc-modified hydrotalcite: manufactured by Kyowa Chemical Industry Co., Ltd.), can be used. Examples of the other organic flame retardant aids include pentaerythritol.

In addition, in the antistatic resin composition of the present invention, as required, an additive(s) normally used in synthetic resins, for example, a cross-linking agent, an anti-fogging agent, an anti-plate-out agent, a surface treatment agent, a plasticizer, a lubricant, a flame retardant, a fluorescent agent, an antifungal agent, an antibacterial agent, a foaming agent, a metal inactivator, a mold-release agent, a pigment, a processing aid, an antioxidant and/or a light stabilizer, may also be incorporated in such a range that does not impair the effects of the present invention.

The additives to be incorporated into the antistatic resin composition of the present invention may be directly added to a thermoplastic resin, or they may be incorporated into the antistatic agent or antistatic agent composition of the present invention, which may then be added to a thermoplastic resin.

An antistatic resin molded article can be obtained by molding the antistatic resin composition of the present invention. The molding method is not particularly restricted, and examples thereof include extrusion processing, calender processing, injection molding, rolling, compression molding, blow molding and rotational molding. Molded articles of various shapes, such as resin plates, sheets, films, bottles, fibers and special shape articles, can be produced by these methods. Such molded articles obtained from the antistatic resin composition of the present invention exhibit excellent antistatic performance with excellent persistence. Further, the molded articles also have wiping resistance.

The antistatic resin composition of the present invention and molded articles thereof can be used in a wide range of industrial fields, including the fields of electricity/electronics/communication, agriculture/forestry/fisheries, mining, construction, foods, fibers, clothings, health care, coal, petroleum, rubbers, leathers, automobiles, precision instruments, wood materials, building materials, civil engineering, furnitures, printing and musical instruments.

More specific examples of applications where the antistatic resin composition of the present invention and molded articles thereof can be used in office work automation equipments, such as printers, personal computers, word processors, keyboards, PDA (Personal Digital Assistant) devices, phones, copy machines, facsimiles, ECRs (electronic cash registers), electronic calculators, electronic organizers, cards, holders and stationeries; household electric appliances, such as laundry machines, refrigerators, vacuum cleaners, microwave ovens, lighting equipments, game machines, irons and kotatsu; audio and visual devices, such as televisions, video tape recorders, video cameras, radio-cassette players, tape recorders, mini discs, CD players, speakers and liquid crystal displays; and electric/electronic components and communication devices, such as connectors, relays, capacitors, switches, printed circuit boards, coil bobbins, semiconductor sealing materials, LED sealing materials, electric wires, cables, transformers, deflection yokes, distribution boards and clocks; automobile interior and exterior materials; platemaking films; adhesive films; bottles; food containers; food packaging films; pharmaceutical and medical wrapping films; product packaging films; agricultural films; agricultural sheets; and greenhouse films.

Moreover, the antistatic resin composition of the present invention and molded articles thereof can also be used in other various applications, including materials of cars, vehicles, ships, airplanes, buildings and houses as well as construction and civil engineering materials, such as seats (e.g., stuffing and cover materials), belts, ceiling covers, convertible tops, armrests, door trims, rear package trays, carpets, mats, sun visors, wheel covers, mattress covers, air-bags, insulating materials, straps, strap belts, wire coating materials, electric insulating materials, paints, coating materials, veneer materials, floor materials, baffle walls, wallpapers, wall decorating materials, exterior materials, interior materials, roof materials, deck materials, wall materials, pillar materials, floor boards, fence materials, framing and moulding materials, window and door-shaping materials, shingle boards, sidings, terraces, balconies, soundproof boards, heat insulating boards and window materials; and household articles and sporting goods, such as clothing materials, curtains, sheets, non-woven fabric, plywood boards, synthetic fiber boards, rugs, doormats, leisure sheets, buckets, hoses, containers, eye glasses, bags, casings, goggles, ski boards, rackets, terts and musical instruments.

EXAMPLES

The present invention will now be described concretely by way of examples thereof. It is noted here that, in the below-described examples and the like, "%" and "ppm" are all based on mass unless otherwise specified.

Antistatic agents were produced in accordance with the below-described Production Examples. Further, in the Production Examples, the number-average molecular weight was determined by the below-described method of measuring the molecular weight.

<Method of Measuring Molecular Weight>

The number-average molecular weight (hereinafter, referred to as "Mn") was measured by gel permeation chromatography (GPC). The conditions of the Mn measurement were as follows.

Apparatus: GPC apparatus, manufactured by JASCO Corporation
Solvent: tetrahydrofuran
Standard substance: polystyrene
Detector: differential refractometer (RI detector)
Column stationary phase: SHODEX KF-804L, manufactured by Showa Denko K.K.
Column temperature: 40° C.
Sample concentration: 1 mg/1 mL
Flow rate: 0.8 mL/min
Injection volume: 100 μL Production Example 1

To a separable flask, 228 g of 1,4-cyclohexane dimethanol, 230 g of adipic acid and 0.4 g of an antioxidant (ADK STAB AO-60) were added, and these materials were allowed to polymerize for 4 hours under normal pressure with the temperature being slowly increased from 160° C. to 200° C. Then, 0.2 g of zirconium acetate was added thereto and allowed to polymerize for 3 hours at 200° C. under reduced pressure, whereby a polyester was obtained. This polyester had an acid value of 14 and a number-average molecular weight (Mn) of 5,200 in terms of polystyrene.

Next, 300 g of the thus obtained polyester, 150 g of polyethylene glycol having a number-average molecular weight of 4,000, 0.45 g of an antioxidant (ADK STAB AO-60) and 0.45 g of zirconium acetate were added and allowed to polymerize at 200° C. for 5 hours under reduced pressure, whereby a polyether ester comprising hydroxyl groups at both ends was obtained. This polyether ester had a hydroxyl value of 9 and a number-average molecular weight (Mn) of 12,200 in terms of polystyrene.

To 200 g of the thus obtained block polymer comprising hydroxyl groups at both ends, 3.6 g of pyromellitic anhydride was added as a polycarboxylic acid, and the resulting mixture was allowed to polymerize at 240° C. for 4 hours under reduced pressure, whereby an antistatic agent (E)-1 according to the present invention was obtained.

Production Example 2

To a separable flask, 228 g of 1,4-cyclohexane dimethanol, 230 g of adipic acid and 0.4 g of an antioxidant (ADK STAB AO-60) were added, and these materials were allowed to polymerize for 4 hours under normal pressure with the temperature being slowly increased from 160° C. to 200° C. Then, 0.2 g of zirconium acetate was added thereto and allowed to polymerize for 3 hours at 200° C. under reduced pressure, whereby a polyester was obtained. This polyester had an acid value of 14 and a number-average molecular weight (Mn) of 5,200 in terms of polystyrene.

Next, 300 g of the thus obtained polyester, 150 g of polyethylene glycol having a number-average molecular weight of 4,000, 0.45 g of an antioxidant (ADK STAB AO-60) and 0.45 g of zirconium acetate were added and allowed to polymerize at 200° C. for 5 hours under reduced pressure, whereby a polyether ester comprising hydroxyl groups at both ends was obtained. This polyether ester had a hydroxyl value of 9 and a number-average molecular weight (Mn) of 12,200 in terms of polystyrene.

To 200 g of the thus obtained block polymer comprising hydroxyl groups at both ends, 1.7 g of butane-1,2,3,4-tetracarboxylic dianhydride was added as a polycarboxylic acid, and the resulting mixture was allowed to polymerize at 240° C. for 4 hours under reduced pressure, whereby an antistatic agent (E)-2 according to the present invention was obtained.

Production Example 3

To a separable flask, 275 g of hydrogenated bisphenol A, 166 g of adipic acid and 0.4 g of an antioxidant (ADK STAB AO-60) were added, and these materials were allowed to polymerize for 5 hours under normal pressure with the temperature being slowly increased from 170° C. to 200° C. Then, 0.2 g of zirconium acetate was added thereto and allowed to polymerize for 4 hours at 210° C. under reduced pressure, whereby a polyester was obtained. This polyester had an acid value of 28 and a number-average molecular weight (Mn) of 2,800 in terms of polystyrene.

Next, 300 g of the thus obtained polyester, 150 g of polyethylene glycol having a number-average molecular weight of 2,000, 0.45 g of an antioxidant (ADK STAB AO-60) and 0.45 g of zirconium acetate were added and allowed to polymerize at 210° C. for 6 hours under reduced pressure, whereby a polyether ester comprising hydroxyl groups at both ends was obtained. This polyether ester had a hydroxyl value of 4.5 and a number-average molecular weight (Mn) of 6,100 in terms of polystyrene.

To 200 g of the thus obtained block polymer comprising hydroxyl groups at both ends, 4.3 g of trimellitic anhydride was added as a polycarboxylic acid, and the resulting mixture was allowed to polymerize at 240° C. for 4 hours under reduced pressure, whereby an antistatic agent (E)-3 according to the present invention was obtained.

Production Example 4

To a separable flask, 225 g of 1,4-cyclohexane dimethanol, 209 g of sebacic acid and 0.4 g of an antioxidant (ADK STAB AO-60) were added, and these materials were allowed to polymerize for 4 hours under normal pressure with the temperature being slowly increased from 160° C. to 200° C. Then, 0.4 g of zirconium acetate was added thereto and allowed to polymerize for 4 hours at 200° C. under reduced pressure, whereby a polyester was obtained. This polyester had an acid value of 28 and a number-average molecular weight (Mn) of 5,200 in terms of polystyrene.

Next, 200 g of the thus obtained polyester, 200 g of polyethylene glycol having a number-average molecular weight of 2,000, 0.4 g of an antioxidant (ADK STAB AO-60) and 0.4 g of zirconium acetate were added and allowed to polymerize at 210° C. for 6 hours under reduced pressure, whereby a polyether ester comprising hydroxyl groups at both ends was obtained. This polyether ester had a hydroxyl value of 9 and a number-average molecular weight (Mn) of 12,100 in terms of polystyrene.

To 200 g of the thus obtained block polymer comprising hydroxyl groups at both ends, 4.3 g of butane-1,2,3,4-tetracarboxylic dianhydride was added as a polycarboxylic acid, and the resulting mixture was allowed to polymerize at 240° C. for 4 hours under reduced pressure, whereby an antistatic agent (E)-4 according to the present invention was obtained.

Production Example 5

To a separable flask, 99 g of 1,4-cyclohexane dimethanol, 126 g of 1,4-cyclohexane dicarboxylic acid, 150 g of polyethylene glycol having a number-average molecular weight of 2,000 and 0.35 g of an antioxidant (ADK STAB AO-60) were added, and these materials were allowed to polymerize for 6 hours under normal pressure with the temperature being slowly increased from 160° C. to 200° C. Then, 0.35 g of zirconium acetate was added thereto and allowed to polymerize for 5 hours at 210° C. under reduced pressure, whereby a polyether ester comprising hydroxyl groups at both ends was obtained. This polyether ester had a hydroxyl value of 8 and a number-average molecular weight (Mn) of 13,100 in terms of polystyrene.

To 200 g of the thus obtained block polymer comprising hydroxyl groups at both ends, 1.6 g of pyromellitic anhydride was added as a polycarboxylic acid, and these materials were allowed to polymerize at 240° C. for 4 hours under reduced pressure, whereby an antistatic agent (E)-5 according to the present invention was obtained.

Production Example 6

To a separable flask, 312 g of hydrogenated bisphenol A, 175 g of adipic acid and 0.4 g of an antioxidant (ADK STAB AO-60) was added, and these materials were allowed to polymerize for 6 hours under normal pressure with the temperature being slowly increased from 160° C. to 210° C. Then, 0.2 g of zirconium acetate was added thereto and allowed to polymerize for 5 hours at 210° C. under reduced pressure, whereby a polyester was obtained. This polyester had a hydroxyl value of 28 and a number-average molecular weight (Mn) of 4,700 in terms of polystyrene.

Next, 200 g of the thus obtained polyester, 200 g of polyethylene glycol having a number-average molecular weight of 4,000, 22 g of pyromellitic anhydride as a polycarboxylic acid, 0.4 g of an antioxidant (ADK STAB AO-60) and 0.4 g of zirconium acetate were added and allowed to polymerize for 6 hours under reduced pressure with the temperature being slowly increased from 200° C. to 240° C., whereby an antistatic agent (E)-6 according to the present invention was obtained.

Production Example 7

To a separable flask, 186 g of 1,4-cyclohexane dimethanol, 261 g of sebacic acid, 12.8 g of trimellitic anhydride as a polycarboxylic acid and 0.4 g of an antioxidant (ADK STAB AO-60) were added, and these materials were allowed to polymerize for 5 hours under normal pressure with the temperature being slowly increased from 160° C. to 210° C. Then, 0.4 g of zirconium acetate was added thereto and allowed to polymerize for 4 hours at 210° C. under reduced pressure, whereby a polyester was obtained. This polyester had an acid value of 28 and a number-average molecular weight (Mn) of 7,600 in terms of polystyrene.

Next, 150 g of the thus obtained polyester, 100 g of polyethylene glycol having a number-average molecular weight of 2,000, 0.2 g of an antioxidant (ADK STAB AO-60) and 0.25 g of zirconium acetate were added and allowed to polymerize at 240° C. for 6 hours under reduced pressure, whereby an antistatic agent (E)-7 according to the present invention was obtained.

Production Example 8

To a separable flask, 103 g of 1,4-cyclohexane dimethanol, 123 g of 1,4-cyclohexane dicarboxylic acid, 100 g of polyethylene glycol having a number-average molecular weight of 4,000, 3.3 g of citric acid as a polycarboxylic acid and 0.3 g of an antioxidant (ADK STAB AO-60) was added, and these materials were allowed to polymerize for 5 hours under normal pressure with the temperature being slowly increased from 160° C. to 210° C. Then, 0.3 g of zirconium acetate was added thereto and allowed to polymerize for 4 hours under reduced pressure with the temperature being slowly increased from 210° C. to 240° C., whereby an antistatic agent (E)-8 according to the present invention was obtained.

Comparative Production Example 1

The polyether ester comprising hydroxyl groups at both ends was synthesized by the method described in Production Example 1. The thus obtained polyether ester was used as a comparative antistatic agent (1) in Comparative Examples.

Comparative Production Example 2

To a separable flask, 200 g of the polyether ester obtained by the method described in Production Example 1, 4.1 g of benzoate as a monocarboxylic acid, 0.2 g of an antioxidant (ADK STAB AO-60) and 0.2 g of zirconium acetate were added, and these materials were allowed to polymerize for 5 hours at 240° C. under reduced pressure, whereby an antistatic agent was obtained. This antistatic agent was used as a comparative antistatic agent (2) in a Comparative Example.

Comparative Production Example 3

To a separable flask, 200 g of the polyether ester obtained by the method described in Production Example 1, 2.8 g of terephthalic acid as a dicarboxylic acid, 0.2 g of an antioxidant (ADK STAB AO-60) and 0.2 g of zirconium acetate were added, and these materials were allowed to polymerize for 5 hours at 240° C. under reduced pressure, whereby an antistatic agent was obtained. This antistatic agent was used as a comparative antistatic agent (3) in a Comparative Example.

Examples 1 to 17 and Comparative Examples 1 to 8

Using antistatic resin compositions that were each blended based on the respective formulations shown in Tables 1 to 3 below, test pieces were obtained in accordance with the below-described test piece preparation conditions. For each of the thus obtained test pieces, the surface specific resistance (SR value) was measured and a test for evaluation of resistance to wiping with water was conducted as described below. In the same manner, the resin compositions of Comparative Examples were prepared in accordance with the respective formulations shown in Table 4 below and evaluated.

<Conditions for Preparing Test Pieces of Impact Copolymer Polypropylene Resin Compositions>

Using a biaxial extruder manufactured by Ikegai Corp. (PCM30, equipped with a 60-mesh screen), antistatic resin compositions that were blended based on the respective formulations shown in Tables below were each granulated under the conditions of 200° C. and 6 kg/hour to obtain pellets. Then, using a horizontal injection molding machine (NEX80, manufactured by Nissei Plastic Industrial Co., Ltd.), each of the thus obtained pellets was molded at a resin temperature of 200° C. and a die temperature of 40° C. to obtain a test piece of 100 mm×100 mm×3 mm in size.

<Conditions for Preparing Test Pieces of Homopolypropylene Resin Compositions>

Using a biaxial extruder manufactured by Ikegai Corp. (PCM30, equipped with a 60-mesh screen), antistatic resin compositions that were blended based on the respective formulations shown in Tables below were each granulated under the conditions of 230° C. and 6 kg/hour to obtain pellets. Then, using a horizontal injection molding machine (NEX80, manufactured by Nissei Plastic Industrial Co., Ltd.), each of the thus obtained pellets was molded at a resin temperature of 230° C. and a die temperature of 40° C. to obtain a test piece of 100 mm×100 mm×3 mm in size.

<Conditions for Preparing Test Pieces of ABS Resin Compositions>

Using a biaxial extruder manufactured by Ikegai Corp. (PCM30, equipped with a 60-mesh screen), antistatic resin compositions that were blended based on the respective formulations shown in Tables below were each granulated under the conditions of 230° C. and 6 kg/hour to obtain pellets. Then, using a horizontal injection molding machine (NEX80, manufactured by Nissei Plastic Industrial Co., Ltd.), each of the thus obtained pellets was molded at a resin temperature of 230° C. and a die temperature of 50° C. to obtain a test piece of 100 mm×100 mm×3 mm in size.

<Method for Measuring Surface Specific Resistance (SR Value)>

The thus obtained test pieces were each molded and, immediately thereafter, stored under the conditions of a temperature of 25° C. and a humidity of 60% RH. After 1 day and 30 days of storage, under the same atmosphere, the surface specific resistance ($\Omega/\square$) of each molded test piece was measured using an R8340 resistance meter manufactured by Advantest Corporation under the conditions of an applied voltage of 100 V and a voltage application time of 1 minute. The measurement was performed at five spots and an average thereof was determined.

<Test for Evaluation of Resistance to Wiping with Water>

The surface of each of the thus obtained test pieces was wiped with a waste cloth 50 times in running water and subsequently stored for 2 hours under the conditions of a temperature of 25° C. and a humidity of 60%. Thereafter, under the same atmosphere, the surface specific resistance ($\Omega/\square$) was measured using an R8340 resistance meter manufactured by Advantest Corporation under the conditions of an applied voltage of 100 V and a voltage application time of 1 minute. The measurement was performed at five spots and an average thereof was determined.

TABLE 1

| | | Example | | | | | | |
|---|---|---|---|---|---|---|---|---|
| | | 1 | 2 | 3 | 4 | 5 | 6 | 7 |
| Antistatic agent | (E)-1 | 10 | 10 | 10 | 10 | 10 | | |
| | (E)-2 | | | | | | 10 | |
| | (E)-3 | | | | | | | 10 |
| Alkali metal salt | KOAc*1 | | 0.5 | | | | | 0.5 |
| | NaDBS*2 | | | 0.5 | | | | |
| | LiOTs*3 | | | | 0.5 | | 0.5 | |
| Ionic liquid | IBTFS*4 | | | | | 0.5 | | |
| Thermoplastic resin | ICP*5 | 100 | 100 | 100 | 100 | 100 | 100 | 100 |
| | hPP*6 | | | | | | | |
| | ABS*7 | | | | | | | |
| Surface specific resistance ($\Omega/\square$) | After 1 day | $8 \times 10^{12}$ | $7 \times 10^{10}$ | $8 \times 10^{10}$ | $5 \times 10^{10}$ | $2 \times 10^{10}$ | $8 \times 10^{10}$ | $9 \times 10^{10}$ |
| | After 30 days | $7 \times 10^{12}$ | $7 \times 10^{10}$ | $8 \times 10^{10}$ | $5 \times 10^{10}$ | $2 \times 10^{10}$ | $8 \times 10^{10}$ | $9 \times 10^{10}$ |
| Evaluation of resistance to wiping with water ($\Omega/\square$) | | $7 \times 10^{12}$ | $6 \times 10^{10}$ | $8 \times 10^{10}$ | $4 \times 10^{10}$ | $3 \times 10^{10}$ | $9 \times 10^{10}$ | $8 \times 10^{10}$ |

*1 potassium acetate
*2 sodium dodecylbenzenesulfonate
*3 lithium p-toluenesulfonate
*4 1-ethyl-3-methylimidazolium-bis(trifluoromethanesulfonyl)imide
*5 impact copolymer polypropylene, manufactured by Japan Polypropylene Corporation: trade name "BC03B"
*6 homopolypropylene, manufactured by Japan Polypropylene Corporation trade name "MA3"
*7 ABS resin, manufactured by Techno Polymer Co., Ltd. trade name "TECHNO ABS110"

TABLE 2

| | | Example | | | | | | |
|---|---|---|---|---|---|---|---|---|
| | | 8 | 9 | 10 | 11 | 12 | 13 | 14 |
| Antistatic agent | (E)-1 | | | | | | 10 | 10 |
| | (E)-4 | 10 | | | | | | |
| | (E)-5 | | 10 | | | | | |
| | (E)-6 | | | 10 | | | | |
| | (E)-7 | | | | 10 | | | |
| | (E)-8 | | | | | 10 | | |
| Alkali metal salt | KOAc*1 | | | | | | | |
| | NaDBS*2 | 0.5 | | | | | | |
| | LiOTs*3 | | 0.5 | 0.5 | 0.5 | 0.5 | 0.5 | 0.5 |

TABLE 2-continued

|  |  | Example | | | | | | |
|---|---|---|---|---|---|---|---|---|
|  |  | 8 | 9 | 10 | 11 | 12 | 13 | 14 |
| Ionic liquid | IBTFS*4 | | | | | | | |
| Thermoplastic resin | ICP*5 | 100 | 100 | 100 | 100 | 100 | | |
|  | hPP*6 | | | | | | 100 | |
|  | ABS*7 | | | | | | | 100 |
| Surface specific resistance (Ω/□) | After 1 day | $1 \times 10^{11}$ | $7 \times 10^{10}$ | $6 \times 10^{10}$ | $1 \times 10^{11}$ | $6 \times 10^{11}$ | $5 \times 10^{11}$ | $8 \times 10^{11}$ |
|  | After 30 days | $9 \times 10^{10}$ | $7 \times 10^{10}$ | $5 \times 10^{10}$ | $9 \times 10^{10}$ | $6 \times 10^{11}$ | $6 \times 10^{11}$ | $8 \times 10^{11}$ |
| Evaluation of resistance to wiping with water (Ω/□) | | $9 \times 10^{10}$ | $7 \times 10^{10}$ | $5 \times 10^{10}$ | $9 \times 10^{10}$ | $5 \times 10^{11}$ | $5 \times 10^{11}$ | $7 \times 10^{11}$ |

TABLE 3

|  |  | Example | | |
|---|---|---|---|---|
|  |  | 15 | 16 | 17 |
| Antistatic agent | (E)-1 | 7 | 7 | 15 |
| Alkali metal salt | KOAc*1 | | | |
|  | NaDBS*2 | | 0.35 | |
|  | LiOTs*3 | | | 0.75 |
| Ionic liquid | IBTFS*4 | | | |
| Thermoplastic resin | ICP*5 | 100 | 100 | 100 |
|  | hPP*6 | | | |
|  | ABS*7 | | | |
| Surface specific resistance (Ω/□) | After 1 day | $5 \times 10^{13}$ | $5 \times 10^{12}$ | $3 \times 10^{9}$ |
|  | After 30 days | $5 \times 10^{13}$ | $5 \times 10^{12}$ | $3 \times 10^{9}$ |
| Evaluation of resistance to wiping with water (Ω/□) | | $4 \times 10^{13}$ | $4 \times 10^{12}$ | $2 \times 10^{9}$ |

TABLE 4

|  |  | Comparative Example | | | | | | | |
|---|---|---|---|---|---|---|---|---|---|
|  |  | 1 | 2 | 3 | 4 | 5 | 6 | 7 | 8 |
| Comparative Antistatic agent | (1) | 10 | 10 | | | | | | |
|  | (2) | | | 10 | | | | | |
|  | (3) | | | | 10 | | | | |
|  | (4)*8 | | | | | 10 | | | |
| Alkali metal salt | KOAc*1 | | 0.5 | | | | | | |
|  | NaDBS*2 | | | | | | | | |
|  | LiOTs*3 | | | | | | | | |
| Ionic liquid | IBTFS*4 | | | | | | | | |
| Thermoplastic resin | ICP*5 | 100 | 100 | 100 | 100 | 100 | 100 | | |
|  | hPP*6 | | | | | | | 100 | |
|  | ABS*7 | | | | | | | | 100 |
| Surface specific resistance (Ω/□) | After 1 day | $9 \times 10^{14}$ | $7 \times 10^{14}$ | $1 \times 10^{15}$ | $5 \times 10^{14}$ | $8 \times 10^{14}$ | $1 \times 10^{15}$ | $1 \times 10^{15}$ | $3 \times 10^{15}$ |
|  | After 30 days | $9 \times 10^{14}$ | $7 \times 10^{14}$ | $1 \times 10^{15}$ | $5 \times 10^{14}$ | $7 \times 10^{14}$ | $1 \times 10^{15}$ | $1 \times 10^{15}$ | $3 \times 10^{15}$ |
| Evaluation of resistance to wiping with water (Ω/□) | | $8 \times 10^{14}$ | $8 \times 10^{14}$ | $1 \times 10^{15}$ | $4 \times 10^{14}$ | $7 \times 10^{14}$ | $1 \times 10^{15}$ | $1 \times 10^{15}$ | $3 \times 10^{15}$ |

*8polyether ester amide-based antistatic agent, manufactured by BASF Japan Ltd.: trade name "IRGASTAT P-22"

From the results shown in the above tables, it is apparent that, according to the present invention, an antistatic agent which is capable of providing excellent antistatic effect in a small amount and has sufficient persistence and wiping resistance can be obtained.

The invention claimed is:

1. An antistatic agent comprising a polymer compound (E) having a structure in which a diol, a dicarboxylic acid, a compound (B) which comprises at least one group represented by the following Formula (1) and has hydroxyl groups at both ends, and a polycarboxylic acid compound (D) are bound via ester bonds:

$$-CH_2-CH_2-O- \quad (1)$$

wherein said polymer compound (E) has a structure in which a polyester (A), which is constituted by a diol and a dicarboxylic acid, said compound (B) and said polycarboxylic acid compound (D) are bound via ester bonds, and wherein said polymer compound (E) has a structure in which a block polymer (C) having hydroxyl groups at both ends and said polycarboxylic acid compound (D) are bound via an ester bond, said block polymer (C) comprising a block constituted by said polyester (A) and a block constituted by said compound (B) that are repeatedly and alternately bound via ester bonds.

2. The antistatic agent according to claim 1, wherein said polyester (A) has a structure comprising carboxyl group at one or both ends.

3. The antistatic agent according to claim 1, wherein said block constituted by said polyester (A) has a number-average molecular weight of 800 to 8,000 in terms of polystyrene, said block constituted by said compound (B) has a number-average molecular weight of 400 to 6,000 in terms of polystyrene, and said block polymer (C) has a number-average molecular weight of 5,000 to 25,000 in terms of polystyrene.

4. The antistatic agent according to claim 1, wherein said compound (B) is a polyethylene glycol.

5. The antistatic agent according to claim 1, wherein said polycarboxylic acid compound (D) is a carboxylic acid having three or more carboxyl groups.

6. An antistatic agent composition comprising at least one selected from the group consisting of alkali metal salts and Group II element salts in the antistatic agent according to claim 1.

7. An antistatic resin composition comprising a thermoplastic resin and the antistatic agent according to claim 1.

8. The antistatic resin composition according to claim 7, wherein said thermoplastic resin is at least one selected from the group consisting of polyolefin-based resins, polystyrene-based resins and copolymers thereof.

9. The antistatic resin composition according to claim 7, wherein the mass ratio of said thermoplastic resin and said antistatic agent is in a range of 99/1 to 40/60.

10. A molded article composed of the antistatic resin composition according to claim 7.

11. An antistatic resin composition comprising a thermoplastic resin and the antistatic agent composition according to claim 6.

12. The antistatic resin composition according to claim 11, wherein the mass ratio of said thermoplastic resin and said antistatic agent composition is in a range of 99/1 to 40/60.

* * * * *